United States Patent
Kumar et al.

(10) Patent No.: US 11,778,479 B2
(45) Date of Patent: Oct. 3, 2023

(54) METHODS TO IMPROVE USER EQUIPMENT PERFORMANCE IN DSS DEPLOYMENTS

(71) Applicant: QUALCOMM Incorporated, San Diego, CA (US)

(72) Inventors: Akash Kumar, Hyderabad (IN); Marian Madan, Bad Soden am Taunus (DE)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 17/304,722

(22) Filed: Jun. 24, 2021

(65) Prior Publication Data
US 2022/0417760 A1 Dec. 29, 2022

(51) Int. Cl.
| | | |
|---|---|---|
| H04W 4/00 | (2018.01) | |
| H04W 16/14 | (2009.01) | |
| H04B 17/336 | (2015.01) | |
| H04L 1/00 | (2006.01) | |
| H04W 24/10 | (2009.01) | |

(52) U.S. Cl.
CPC .......... *H04W 16/14* (2013.01); *H04B 17/336* (2015.01); *H04L 1/0003* (2013.01); *H04L 1/0017* (2013.01); *H04W 24/10* (2013.01)

(58) Field of Classification Search
CPC .................................................. H04W 36/22
See application file for complete search history.

(56) References Cited

U.S. PATENT DOCUMENTS

| | | | |
|---|---|---|---|
| 11,089,529 B1* | 8/2021 | Lekutai | H04W 36/32 |
| 11,265,943 B1* | 3/2022 | Marupaduga | H04W 76/16 |
| 2013/0102313 A1* | 4/2013 | Tinnakornsrisuphap | H04W 36/22 455/436 |
| 2013/0109393 A1* | 5/2013 | Shi | H04W 36/00835 455/437 |
| 2015/0072667 A1* | 3/2015 | Hu | H04W 8/183 455/418 |
| 2015/0092611 A1 | 4/2015 | Ponukumati et al. | |
| 2015/0230135 A1* | 8/2015 | Yang | H04W 36/0022 370/331 |

(Continued)

FOREIGN PATENT DOCUMENTS

| | | |
|---|---|---|
| EP | 2744256 A1 | 6/2014 |
| EP | 3459290 A1 | 3/2019 |

(Continued)

OTHER PUBLICATIONS

International Search Report and Written Opinion—PCT/US2022/033904—ISA/EPO—dated Oct. 4, 2022.

*Primary Examiner* — Zhiren Qin
(74) *Attorney, Agent, or Firm* — Haynes and Boone, LLP

(57) ABSTRACT

Wireless communications systems and methods related to downlink performance of a UE in a wireless communication network are provided. For example, method of wireless communication performed by a user equipment (UE), the method comprising determining a level of interference to a reference signal received from a serving base station operating a first radio access technology (RAT) and switching, based on the determined level of interference, a radio access technology mode preference of the UE to a second RAT, the second RAT being different from the first RAT. Other features are also claimed and described.

30 Claims, 8 Drawing Sheets

(56) References Cited

U.S. PATENT DOCUMENTS

| | | | |
|---|---|---|---|
| 2015/0341814 A1* | 11/2015 | Yu ........................ | H04J 11/0023 |
| | | | 370/252 |
| 2016/0014664 A1* | 1/2016 | Singh .................... | H04W 36/14 |
| | | | 370/332 |
| 2017/0048773 A1 | 2/2017 | Miao et al. | |
| 2018/0262251 A1* | 9/2018 | Kim ...................... | H04B 7/0626 |
| 2018/0368098 A1* | 12/2018 | Gopal ................... | H04W 68/02 |
| 2019/0069210 A1* | 2/2019 | Lee ....................... | H04W 36/32 |
| 2019/0208543 A1 | 7/2019 | Dhanapal et al. | |
| 2020/0107284 A1* | 4/2020 | Nguyen ............... | H04W 52/383 |
| 2021/0144545 A1* | 5/2021 | Krishnamoorthy .......................... | |
| | | | H04W 74/0833 |
| 2022/0201581 A1* | 6/2022 | Li ....................... | H04W 36/0058 |
| 2022/0225225 A1* | 7/2022 | Cui ....................... | H04W 48/18 |

FOREIGN PATENT DOCUMENTS

| | | |
|---|---|---|
| WO | 2020045952 A1 | 3/2020 |
| WO | 2021016909 | 2/2021 |

* cited by examiner

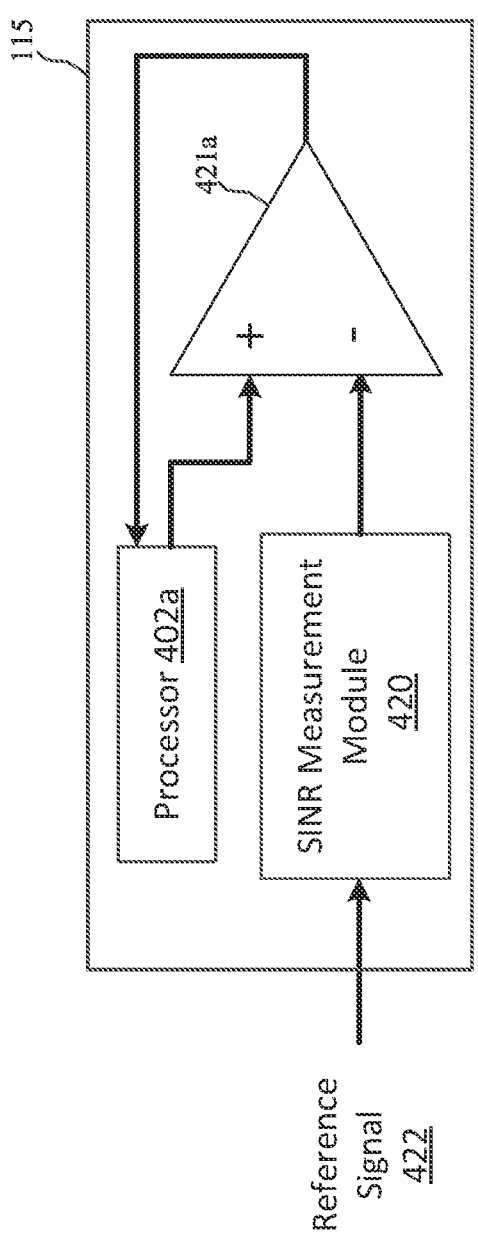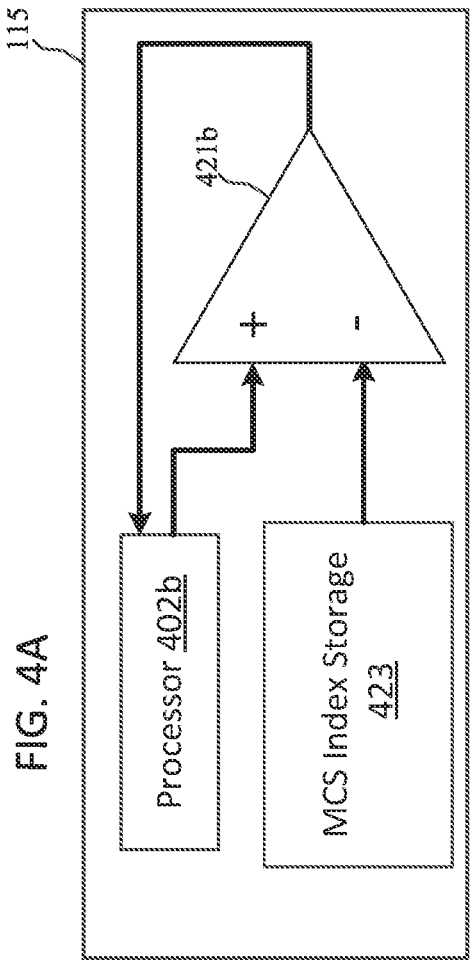
FIG. 4A
FIG. 4B

METHODS TO IMPROVE USER EQUIPMENT PERFORMANCE IN DSS DEPLOYMENTS

TECHNICAL FIELD

This application relates to wireless communication systems, and more particularly to improving the downlink data performance of user equipment (UE) in a dynamic spectrum sharing deployment of a wireless communication network.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth, a higher throughput, and/or a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as mmWave bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In some wireless communications networks operating in a dynamic spectrum sharing (DSS) mode, UEs may dynamically share spectrum in a frequency division or a time-division mode. However, certain signals transmitted from a BS operating a radio access technology (RAT) may interfere with the signals transmitted from other BSs (e.g., neighboring BSs) operating a different RAT. The interference from neighboring BS signals may negatively affect the downlink performance (e.g., downlink data rate) of a UE subjected to the interference. For example, persistent signals (e.g., reference signals) from neighboring BSs may interfere with a downlink data channel (e.g., a physical downlink shared channel (PDSCH)) of a UE thereby reducing the downlink data rate of the UE. In some instances, switching the operating RAT mode of the UE may reduce the interference from neighboring BSs and improve the downlink data rate of the UE. Accordingly, improved methods of switching a RAT mode of a UE are desirable.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a UE may include determining a level of interference to a reference signal received from a serving base station operating a first radio access technology (RAT) and switching, based on the determined level of interference, a RAT mode preference of the UE to a second, different RAT.

In an additional aspect of the disclosure, a UE may include a processor configured to determine a level of interference to a reference signal received from a serving base station operating a first RAT and switch, based on the level of interference, a RAT mode preference of the UE to a second, different RAT.

In an additional aspect of the disclosure, a non-transitory computer-readable medium may have program code recorded thereon for wireless communication by a UE. The program code may include code for causing the UE to determine a level of interference to a reference signal received from a serving base station operating a first RAT and code for causing the UE to switch, based on the level of interference, a RAT mode preference of the user equipment to a second, different RAT.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIGS. 4A and 4B are block diagrams of example circuits that determines a level of interference to a UE according to some aspects of the present disclosure.

DETAILED DESCRIPTION

Figure 1:
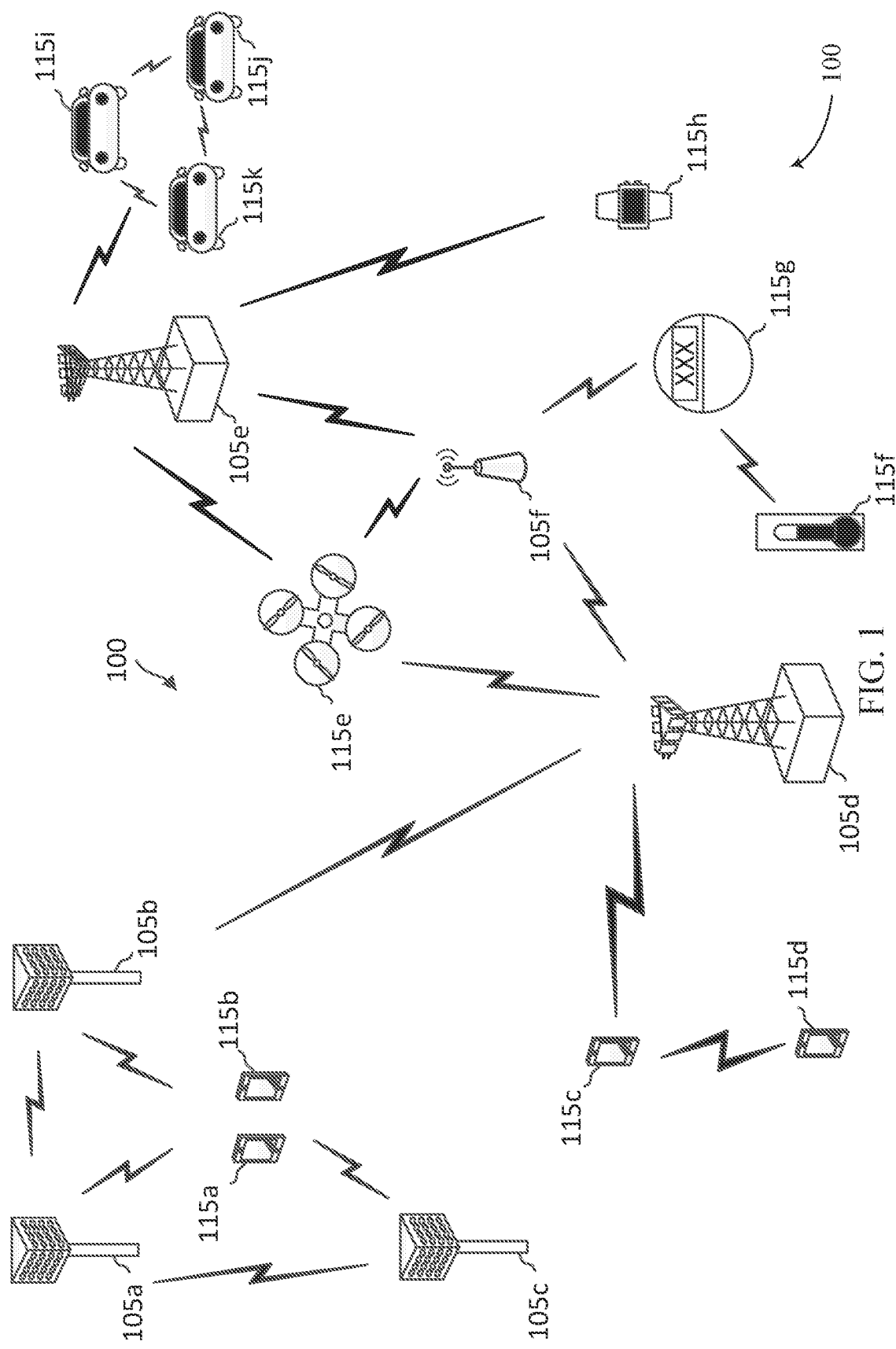
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Aspects of the present disclosure can provide several benefits. For example, determining a level of interference to a UE and switching the RAT mode of the UE to avoid the interference allows the UE to experience a higher quality of service (e.g., higher data rates). Aspects of the present disclosure can also improve the spectral efficiency of the network and reduce data transmission errors. User satisfaction may be increased by providing improved communication performance in DSS deployments and multi-SIM devices.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-V2X (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide an ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ acknowledgement (ACK) to the BS 105. Conversely, if the UE 115 fails to receive the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
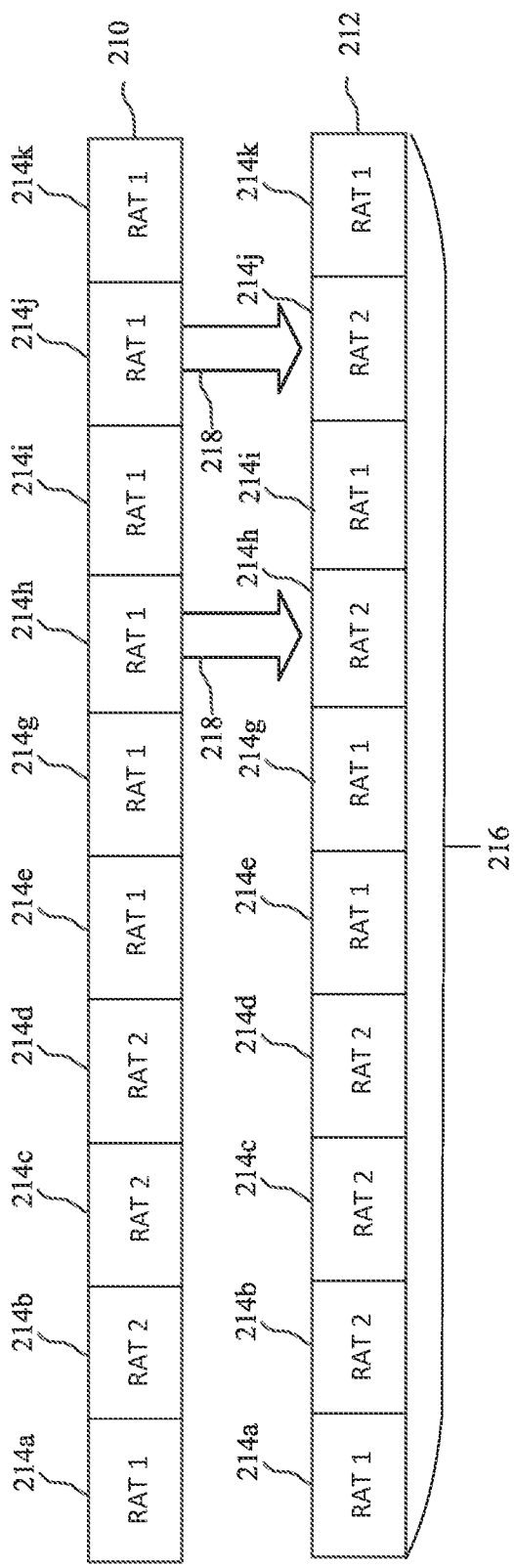
FIG. 2 illustrates a frame structure of a wireless communication network operating in a DSS mode according to some aspects of the present disclosure.

FIG. 2 illustrates a cell 1 frame 210 and a cell 2 frame 212 of a wireless communication network operating in a DSS mode according to some aspects of the present disclosure. Cell 1 frame 210 and cell 2 frame 212 may represent the frame structures of adjacent or nearby located cells. Cell 1 and Cell 2 may operate in a time division DSS mode. Time division DSS may allocate different timeslots to different RATs. Since LTE and 5G NR both have a frame time 216 of 10 ms including 10 subframes 214a . . . 214k, each subframe 214a . . . 214k of 1 ms may be allocated to either LTE or 5G NR. As shown in FIG. 2, cell 1 frame 210 may allocate subframes 214a, 214e, 214g, 214h, 214i, 214j, and 214k to RAT 1 (e.g., LTE) and allocate subframes 214b, 214c, 214d to RAT 2 (e.g., 5G NR). Whereas, cell 2 frame 212 may allocate subframes 214a, 214e, 214g, 214i, and 214k to RAT 1 (e.g., LTE) and allocate subframes 214b, 214c, 214d, 214h, and 214j to RAT 2 (e.g., 5G NR). In some instances, operating different RATs in adjacent or nearby cells in the same subframes (e.g., same time slots) may provide acceptable performance (e.g., downlink performance over PDSCH channels). However, in some instances, operating different RATs in adjacent or nearby cells in the same subframes (e.g., same time slots) may result in a decreased level (e.g., an unacceptable level) of performance (e.g., downlink performance over PDSCH channels) thereby limiting the downlink data rate to a UE (e.g., UEs 115).

Figure 3:
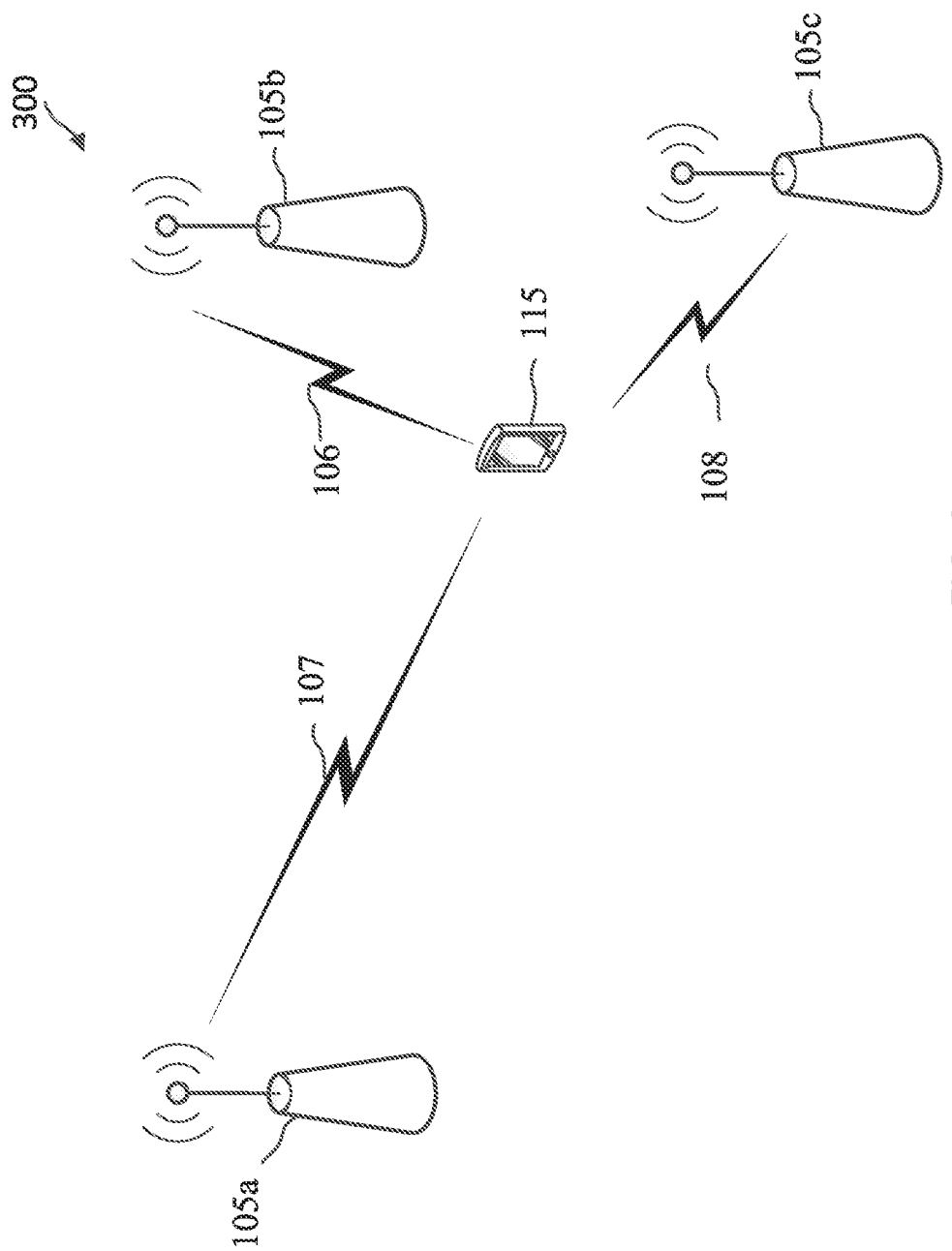
FIG. 3 illustrates a UE receiving interference in a wireless communication network operating in a DSS mode according to some aspects of the present disclosure.

The decreased level of downlink performance may be due to interference between adjacent cells (e.g., adjacent BSs 105a, 105b, 105c of FIG. 3). In some instances, the interference may occur in time slots in which the adjacent cells are operating different RATs. For example, when cell 1 frame 210 is operating RAT 1 (e.g., LTE) in subframes 214h and 214j and cell 2 frame 212 is operating RAT 2 (e.g., 5G NR) in the same subframes 214h and 214j, certain LTE transmissions represented by arrows 218 may interfere with the downlink performance of PDSCH channels transmitted in cell 2. For example, certain signals (e.g., persistent LTE cell specific reference signals (CRS) and/or LTE PDSCH) transmitted by neighboring cells may interfere with PDSCH channels transmitted in a serving cell. UEs camped on 5G NR in the serving cell may receive interference during time slots when a neighboring cell is operating RAT 1 (e.g., LTE) in subframes 214h and 214j. However UEs camped on LTE in the serving cell may be configured to reduce the interference due to persistent CRS signals and/or LTE PDSCH from neighboring cells through interference cancellation. For example, during time slots in subframes 214a, 214e, 214g, 214i, and 214k of cell 2 frame 212, UEs camped on LTE in the serving cell may be configured to cancel the interference due to LTE CRS and/or LTE PDSCH transmissions during time slots in subframes 214a, 214e, 214g, 214i, and 214k of cell 1 frame 210 (e.g., the neighboring cell).

In some instances, a higher level of interference from a neighboring cell may be due to the LTE CRS signal transmitted by the neighboring cell as compared to LTE PDSCH transmissions. The LTE CRS signal may be a persistent signal transmitted multiple times in each subframe as compared to LTE PDSCH transmissions that are dependent upon user data traffic. Further, the power transmission level of the LTE CRS signal may be configured to be higher (e.g., boosted) than the transmit power of a resource element (RE)

carrying PDSCH. In some instances, the ratio of the LTE CRS RE power to the LTE PDSCH RE power may be about 3 dB to about 5 dB.

In some instances, the UE may determine a level of interference from BSs in neighboring cells and switch a RAT mode preference based on the level of interference. For example, the UE may measure a level of interference to a reference signal received from a serving base station and compare the level of interference to a threshold. When the level of interference exceeds the threshold, the UE may then switch the RAT mode preference. For example, the UE may be operating in a 5G NR mode and experience interference from LTE CRS signal(s) transmitted from BS(s) in neighboring cell(s). When the interference level exceeds the threshold, the UE may switch the RAT mode preference to LTE.

FIG. 3 illustrates a UE 115 receiving interference in a wireless communication network 300 operating in a DSS mode according to some aspects of the present disclosure. The BSs 105a, 105b, and 105c may be substantially similar to the BSs 105a . . . 105e of FIG. 1, and the UE 115 may be substantially similar to the UEs 115a . . . 115k of FIG. 1. As shown in FIG. 3, the UE 115 may be camped on the serving BS 105b. The UE 115 may be connected to the serving BS 105b using a 5G NR RAT. For example, the UE 115 may receive 5G NR signals 106 in the allocated subframes 214b, 214c, 214d, 214h, and 214j as shown in FIG. 2. The BS 105a and/or BS 105c may be neighboring BSs to the BS 105b. That is, the BS 105a and/or BS 105c may be in proximity to the BS 105b such that signals 107 transmitted by the BS 105a and/or signals 108 transmitted by BS 105c may be received by the UE 115. Signals 107 transmitted by the BS 105a and/or signals 108 transmitted by BS 105c may be received by the UE 115 at varying power levels based on parameters including the power level of the signals 107 transmitted by the BS 105a and/or signals 108 transmitted by BS 105c, the distance between the UE 115 and the BS 105a and/or BS 105c, the wireless propagation channel between the UE 115 and the BS 105a and/or BS 105c, etc. The signals 107 transmitted by the BS 105a and/or signals 108 transmitted by BS 105c may not be intended for receipt by the UE 115. The signals 107 transmitted by the BS 105a and/or signals 108 transmitted by the BS 105c that are received by the UE 115 may interfere with the signals 106 (e.g., PDSCH) that are intended for receipt by the UE 115.

In some instances, the UE 115 may determine that the level of interference to the signals 106 (e.g., PDSCH) that are intended for receipt by the UE 115 have exceeded a threshold that prevents the UE 115 from achieving acceptable downlink performance (e.g., an acceptable downlink data rate, BLER, etc.) from the BS 105b. The UE 115 may determine that the level of interference has exceeded a threshold using any method. For example, as described below with reference to FIG. 4, the UE 115 may compare a signal-to-noise-plus-interference ratio (SINR) of a reference signal (e.g., a reference signal received power (RSRP) reference signal and/or a physical downlink shared channel (PDSCH)) to an SINR threshold. Additionally or alternatively, the UE 115 may determine that the level of interference has exceeded a threshold by comparing a downlink modulation and coding scheme (MCS) index of the UE 115 to an MCS index threshold. In response to determining that the level of interference has exceeded the threshold, the UE 115 may switch the RAT mode preference of the UE 115 from 5G NR to LTE. Switching the RAT mode preference may include an autonomous decision executed by the UE 115 and not explicitly communicated to the BS 105b. In some instances, when the UE 115 is in an idle mode (e.g., RRC_idle mode), the UE 115 may prioritize the LTE RAT cell selection rather than the 5G SA (5G standalone) cell selection and autonomous reselection from 5G SA cell to LTE cell.

In some instances, when the UE 115 is in connected mode (e.g., RRC_connected mode), the UE 115 may report the level of interference as exceeding a threshold to the BS 105b. In response to receiving a measurement report from the UE 115 indicating the interference has exceeded the threshold, the BS 105b may remove the 5G NR cell from the EN-DC (E-UTRA-NR Dual Connectivity) set in the case of the UE 115 having an EN-DC connection and/or perform a handover towards the LTE cell in the case of the UE 115 having a 5G SA connection.

In some instances, the level of interference on the UE 115 may vary based on the distance of the UE 115 to the BS 105a and/or BS 105c. As the distance of the UE 115 from the BS transmitting the interfering signals decreases, the level of interference may increase. Conversely, as the distance of the UE 115 from the BS transmitting the interfering signals increases, the level of interference may decrease. In some instances, the BSs 105a, 105b, and 105c may be fixed (stationary) devices (e.g., cell towers, access points, relays, etc.). The UE 115 may be configured a mobile device (e.g., a smartphone, a vehicle, etc.) and therefore the distance between the UE 115 and the BSs 105a, 105b, and 105c may vary as the UE 115 moves. The movement of the UE 115 with respect to the BSs 105a, 105b, and 105c may cause the level of interference to the UE 115 to vary above and below the threshold based on the relative distances and/or the wireless propagation paths between the UE 115 and the BSs 105a, 105b, and 105c. In some instances, the UE 115 may switch the RAT mode preference of the UE 115 from 5G NR to LTE when the level of interference exceeds the threshold and switch the RAT mode preference of the UE 115 from LTE back to 5G NR when the level of interference falls below the threshold. In some instances, the UE 115 may set a switching differential (e.g., a hysteresis) for the threshold level of interference. In order to avoid excessive switching (e.g., ping-pong effect) between the LTE RAT and the 5G NR RAT, the UE 115 may set a first threshold level of interference for switching from 5G NR to LTE and a second, lower threshold level of interference for switching from LTE to 5G NR.

In some instances, when the level of interference to the UE 115 exceeds the threshold level of interference, the UE 115 may switch the RAT mode to a different RAT mode operating on BS 105b. For example, BS 105b and the UE 115 may be configured to operate on both LTE and 5G NR. The 5G NR may operate in a non-standalone mode in which the UE 115 connects to both LTE for the control plane signaling and 5G NR for the data plane on BS 105b. In some instances, BS 105b may be configured to operate in a standalone mode in which BS 105b uses 5G NR for both control plane signaling and data plane. BS 105b may be configured to operate in a standalone mode using 5G Packet Core architecture instead of relying on the LTE Evolved Packet Core, to allow the deployment of 5G without the LTE network. In the case in which the BS 105b is configured to operate in 5G NR standalone mode and the level of interference to the UE 115 exceeds the threshold level of interference, the UE 115 may not only switch the RAT mode from 5G NR to LTE but also handover to another BS (e.g., BS 105a or 105c) operating LTE.

FIGS. 4A and 4B are block diagrams of example circuits that may be configured to determine a level of interference to a UE 115 according to some aspects of the present disclosure. The UE 115 of FIGS. 4A and 4B may be substantially similar to the UEs 115*a* . . . 115*k* of FIG. 1. As described above with reference to FIG. 3, the UE 115 may determine a level of interference and switch a RAT preference mode based on the level of interference. The level of interference may be determined using any method. For example, the UE 115 may measure a level of interference to a reference signal received power (RSRP) reference signal. As shown in FIG. 4A, the UE 115 may receive an RSRP reference signal 422. The RSRP reference signal 422 may be received by a SINR measurement module 420. The level of interference may be determined by the SINR measurement module 420. The level of interference may be based on the SINR of the RSRP reference signal 422. In some instances, the SINR may be determined as defined in 3GPP standard 38.215. For example, the E-UTRA reference signal signal-to-noise and interference ratio (E-UTRA RS-SINR), may be defined as the linear average over the power contribution (in [W]) of the resource elements carrying cell-specific reference signals divided by the linear average of the noise and interference power contribution (in [W]) over the resource elements carrying cell-specific reference signals within the same frequency bandwidth.

The UE 115 may be configured with a processor 402*a*. Processor 402*a* may be programmed to determine the interference threshold level. The threshold level may be based on a maximum acceptable level of SINR degradation. For example, the maximum acceptable level of SINR degradation may be about 5 dB, about 10 dB, about 15 dB, about 20 dB, about 25 dB, or more. The UE 115 may determine the interference threshold level based on a level of downlink throughput (e.g., downlink data rate) required by the UE 115. The UE 115 may compare the measured SINR to the SINR threshold to determine if the threshold has been exceeded using any method. For example, the UE 115 may use comparator 421*a* to compare the measured SINR to the SINR threshold. The results of the comparison may be fed back to processor 402*a*. When the results of the comparison indicate that the interference level has exceed the threshold the processor 402*a* may switch a RAT preference mode of the UE 115. For example, the processor 402*a* may switch the RAT preference mode from 5G NR to LTE. In some instances, the processor 402*a* may switch the RAT preference mode from 5G NR to 3G. Although FIG. 4A shows an example circuit including comparator 421*a* configured to compare the measured SINR to the SINR threshold, the present disclosure is not so limited. For example, processor 402*a* may execute code configured to compare the measured SINR to the SINR threshold. The UE 115 may periodically compare the measured SINR of the reference signal to the SINR threshold periodically and/or based on an event. For example, the UE 115 may compare the measured SINR of the reference signal to the SINR threshold based on a UE 115 data session requiring high downlink throughput.

In some instances, the UE 115 may determine the level of interference by comparing a downlink modulation and coding scheme (MCS) index of the UE 115 to a threshold. The downlink MCS may define the modulation order, target code rate, and spectral efficiency of the PDSCH. Combinations of modulation order, target code rate, and spectral efficiency may be associated with an MCS index table and an MCS index value (e.g., MCS index value between 0 and 31 based on a target BLER). The MCS may be determined based on the radio signal quality. A higher radio signal quality may allow more data bits to be transmitted per symbol. A higher MCS index value may correlate to a higher radio signal quality. Conversely, a lower MCS index value may correlate to a lower radio signal quality caused by signal interference from neighboring cells (e.g., LTE CRS signals and LTE PDSCH transmissions from neighboring cell(s)).

In some instances, the UE 115 may be configured to use the MCS index value as a proxy for the level of interference. The UE 115 may be configured to determine the level of interference by comparing a downlink MCS index to a threshold. For example, as shown in FIG. 4B, UE may receive control data from a BS (e.g., a gNB) indicating an MCS table and an MCS index value. The UE 115 may store the MCS index value in MCS index storage 423. The processor 402*b* may be programmed to determine an MCS index threshold level. The MCS index threshold level may be based on a level of acceptable spectral efficiency. For example, the MCS index threshold may be set to a value (e.g., a value less than 6, a value between 6 and 10, a value greater than 10) below which the UE 115 may switch a RAT mode preference. The UE 115 may compare the stored MCS index value received from the BS to the MCS index value threshold to determine if the MCS index value is below the MCS index threshold using any method. For example, the UE 115 may use comparator 421*b* to compare the MCS index value to the MCS index threshold. The results of the comparison may be fed back to processor 402*b*. When the results of the comparison indicate that the MCS index value is below the MCS index threshold the processor 402*b* may switch a RAT preference mode of the UE 115. For example, the processor 402*b* may switch the RAT preference mode from 5G NR to LTE. In some instances, the processor 402*b* may switch the RAT preference mode from 5G NR to 3G. Although FIG. 4B shows an example circuit including comparator 421*b* configured to compare the MCS index value to the MCS index threshold, the present disclosure is not so limited. For example, processor 402*b* may execute code configured to compare the MCS index value to the MCS index threshold.

Figure 5:
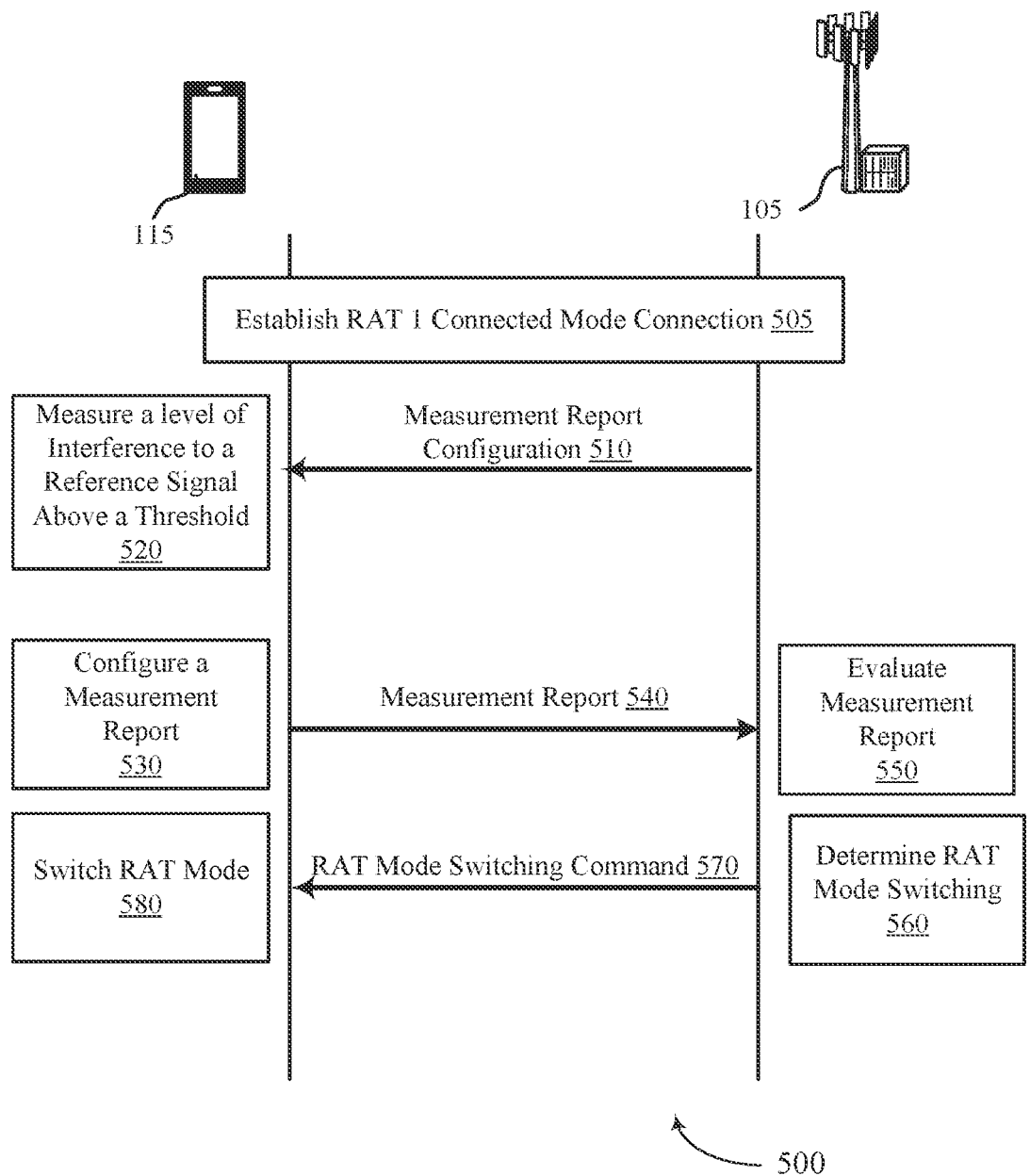
FIG. 5 illustrates a signaling diagram of a method of determining UE interference and switching a RAT mode according to some aspects of the present disclosure.

FIG. 5 illustrates a signaling diagram of a method 500 for improving the downlink data performance of UEs in a DSS deployment of a wireless network according to some aspects of the present disclosure. The method 500 may be implemented between a BS 105 and a UE 115. The BS 105 may be similar to the BSs 105 of FIG. 1, 3, 4, or 7 and the UE 115 may be similar to the UEs 115 of FIG. 1, 3, 4, or 6. The method 500 illustrates the UE 115 determining a level of interference to a reference signal and providing a measurement report to the BS 105 in order to trigger a RAT mode switch. The method 500 may utilize similar mechanisms as discussed above with reference to FIGS. 2-4 to determine the level of interference to the reference signal.

At 505, the UE 115 may power up and enter an idle mode (e.g., RRC_Idle Mode). While in idle mode, the UE 115 may attach to BS 105 and transition to a connected mode (e.g., RRC_Connected Mode) with the BS 105 in which the UE 115 may establish data sessions and/or voice calls with the BS 105 using a 5G NR RAT.

At 510, the BS 105 may transmit parameters to the UE 115 including a measurement report (MR) configuration. The MR configuration may be transmitted via an RRC Reconfiguration message or an RRC Resume message. The MR configuration may include the intra-frequency, inter-frequency, and inter-RAT measurements required by the UE 115 to report to the BS 105.

At 520, the UE 115 may measure a level of interference to a reference signal. The UE 115 may measure the level of interference to a reference signal using the methods described above with reference to FIGS. 2-4. The interference may be caused by signal interference from neighboring cell(s) (e.g., LTE CRS signals and LTE PDSCH transmissions from neighboring cell(s)). For example, the UE 115 may compare a measured SINR of the reference signal to an SINR threshold to determine if the threshold has been exceeded. In some instances, the UE 115 may be configured to use the MCS index value as a proxy for the level of interference. The UE 115 may determine the level of interference by comparing a downlink MCS index to a threshold. The level of interference may exceed the threshold when the MCS index value falls below a set value.

At 530, the UE 115 may configure an MR. In response to the level of interference to a reference signal exceeding the threshold, the UE 115 may bias (e.g., adjust, weight, scale, skew, etc.) the value of certain objects (e.g., measurements) in the MR. For example, the UE 115 may bias any individual or combination of signal-to-noise and interference ratio (SINR), reference signal received power (RSRP), and reference signal received quality (RSRQ) measurement objects. The value of the measurement objects may be biased such that the BS 105 may interpret the contents of the MR to indicate that the quality of service (e.g., BLER, data rate, etc.) to the UE 115 does not meet certain requirements and a RAT mode switch is required to increase the quality of service to the UE 115.

At 540, the UE 115 may transmit the MR to the BS 105. The MR may be transmitted by the UE 115 to the BS 105 on a periodic basis and/or based on an event (e.g., when the measured level of interference exceeds a threshold).

At 550, the BS 105 may evaluate the contents of the MR. The BS 105 may compare the measurement objects (e.g., SINR, RSRP, and/or RSRQ) to certain thresholds. For example, BS 105 may compare the measurement objects to a threshold (e.g., Threshold 1 or Threshold 2 for events A1, A2, A3, A4, or A5 as defined by 3GPP specification 38.331).

At 560, the BS 105 may determine, based on the evaluation of the MR transmitted from the UE 115, that a RAT mode switch is required to increase the quality of service to the UE 115.

At 570, BS 105 may transmit a RAT mode switch command to the UE 115 that instructs the UE 115 to switch to a different RAT (e.g., switch from 5G NR to LTE). In some instances, BS 105 may be configured as a standalone 5G NR BS and may transmit a reconfiguration message to the UE 115 indicating a target cell to switch the UE 115 to that is configured as a different RAT (e.g., LTE). In some instances, the BS 105 may be configured as a non-standalone 5G NR BS and may transmit a reconfiguration message to the UE 115 instructing the UE 115 to switch to a different RAT (e.g., LTE) on BS 105.

At 580, the UE 115 may be configured to establish an RRC connection (e.g., enter RRC_Connected mode) with the RAT defined in the RAT mode switching command received by the UE 115.

Operations 510-580 of method 500 described above includes the UE 115 determining a level of interference to a reference signal exceeding a threshold and providing a measurement report to the BS 105 in order to trigger a RAT mode switch (e.g., switch from 5G NR to LTE). In some instances, the method 500 may further include determining the level of interference to the reference signal has fallen below the threshold and providing a measurement report to the BS 105 in order to trigger a further RAT mode switch (e.g., switch from LTE back to 5G NR).

Figure 6:
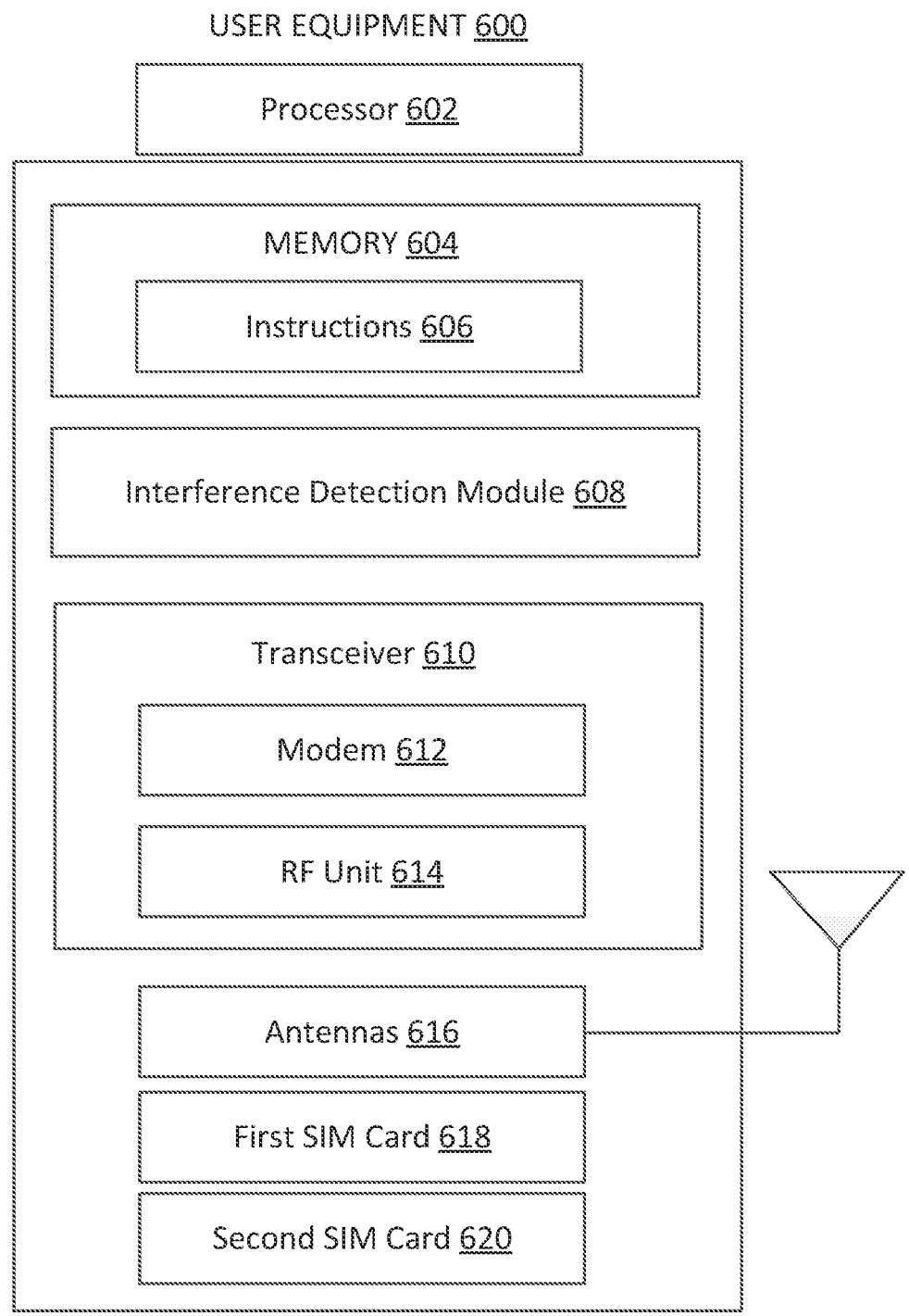
FIG. 6 is a block diagram of a user equipment (UE) according to some aspects of the present disclosure.

FIG. 6 is a block diagram of an exemplary UE 600 according to some aspects of the present disclosure. The UE 600 may be a UE 115 discussed above with reference to FIGS. 1-5. As shown in FIG. 6, the UE 600 may include a processor 602, a memory 604, an interference detection module 608, a transceiver 610 including a modem subsystem 612 and a radio frequency (RF) unit 614, and one or more antennas 616. These elements may be coupled with one another. The term "coupled" may refer to directly or indirectly coupled or connected to one or more intervening elements. For instance, these elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs 115 in connection with aspects of the present disclosure, for example, aspects of FIGS. 2-5 and 8. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The interference detection module 608 may be implemented via hardware, software, or combinations thereof. For example, the interference detection module 608 may be implemented as a processor, circuit, and/or instructions 606 stored in the memory 604 and executed by the processor 602. In some instances, the interference detection module 608 can be integrated within the modem subsystem 612. For example, the interference detection module 608 can be implemented by a combination of software components (e.g., executed by a DSP or a general processor) and hardware components (e.g., logic gates and circuitry) within the modem subsystem 612.

The interference detection module 608 may be used for various aspects of the present disclosure, for example, aspects of FIGS. 2-5 and 8. The interference detection module 608 may be configured to control the processor 602 and/or the transceiver 610 to determine a level of interference to a reference signal received by the UE 115 from a serving base station (e.g., BS 105, BS 700) operating a first RAT and switch a RAT mode preference of the UE to a second RAT based on the determined level of interference. The second RAT may be different from the first RAT. For example, the first RAT may include a 5G NR RAT and the second RAT may include an LTE RAT or a 3G RAT. The UE 600 may be configured for dynamic spectrum sharing (DSS) between the first RAT and the second RAT. In some instances, the interference may be caused by CRS and/or PDSCH signals received from neighboring BSs (e.g., BSs other than the serving BS).

The interference detection module 608 may be configured to control the processor 602 and/or the transceiver 610 to determine the level of interference by comparing a SINR of the reference signal (e.g., an RSRP reference signal and/or a physical downlink shared channel (PDSCH)) to a threshold. In some instances, the interference detection module 608 may be configured to determine the level of interference by comparing a downlink MCS index of the UE 600 to a threshold (e.g., a downlink MCS index less than or equal to a value of eight). When the RAT mode preference is switched to the second RAT, the interference detection module 608 may be configured to switch (e.g., autonomously switch) the RAT mode of the UE 600 to the second RAT in order avoid (e.g., mitigate) the interference and increase a quality of service (e.g., the data rate on PDSCH) to the UE 600. In some instances, the interference detection module 608 may be configured to switch the RAT mode of the UE 600 to the second RAT during an idle mode (e.g., RRC_idle Mode). The RAT mode switching may be based on a level of downlink throughput required by the UE 600.

In some instances, the UE 600 may be configured to operate in a multi-subscriber identification module mode and include multiple SIM card sockets (e.g., UICC card sockets). For example, the UE 600 may include SIM card sockets populated with a first SIM card 618 and a second SIM card 620. The first SIM card 618 and the second SIM card 620 may be provided by the same wireless network operator and each of the first SIM card 618 and the second SIM card 620 may enable a voice/data subscription to a different RAT. For example, the first SIM card 618 may enable a subscription to a 5G NR RAT and the second SIM card 620 may enable a subscription to a 4G LTE RAT. If a user of UE 600 does not select a preferred SIM card from the first SIM card 618 or the second SIM card 620, the preferred SIM card may default to the SIM card with the highest technology generation available (e.g., the first SIM card 618 that enables a subscription to a 5G NR RAT).

In some instances, the UE 600 may camp the first SIM card 618 subscription in 5G NR mode and the second SIM card 620 in LTE mode on the same cell. The interference detection module 608 may be configured to control transceiver 610 to determine the level of interference to the 5G NR connection from the neighboring cell's signals (e.g., LTE CRS interference) based on the methods described above with reference to FIGS. 2-5. The interference detection module 608 may determine, based on the level of interference, that the UE 600 may experience a higher quality of service operating on the SIM card two 620 connected via LTE service. Based on the determination that the second SIM card 620 provides a higher quality of service (QOS), processor 602 and/or interference detection module 608 may execute code causing the default data subscription to be assigned to the second SIM card 620 (e.g., LTE). In some instances, interference detection module 608 may dynamically monitor the QOS of the 5G NR RAT and the LTE RAT and assign the default data subscription based on the QOS.

As shown in FIG. 6, the transceiver 610 may include the modem subsystem 612 and the RF unit 614. The transceiver 610 can be configured to communicate bi-directionally with other devices, such as the BS 105, and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., phase modulated signals, amplitude modulated signals, polarization modulated signals, uplink control information (UCI) signaling, medium access control (MAC) control element (CE) signaling, radio resource control (RRC) signaling, a reference signal, a cell specific reference signal, a pilot signal, a downlink reference signal, a user equipment specific reference signal) from the modem subsystem 612 (on outbound transmissions) or of transmissions originating from another source. The RF unit 614 may be further configured to perform analog beamforming in conjunction with the digital beamforming. Although shown as integrated together in transceiver 610, the modem subsystem 612 and/or the RF unit 614 may be separate devices that are coupled together to enable the UE 115 to communicate with other devices.

The RF unit 614 may provide the modulated and/or processed data, e.g., data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., the MR configuration, the RAT mode switching commands, downlink control information (DCI) signaling, medium access control (MAC) control element (CE) signaling, or radio resource control (RRC) signaling) to the interference detection module 608 for processing. The antennas 616 may include multiple antennas of similar or different designs in order to sustain multiple transmission links. The RF unit 614 may configure the antennas 616.

In an aspect, the UE 600 can include multiple transceivers 610 implementing different RATs (e.g., NR and LTE) operating in DSS mode. In an aspect, the UE 600 can include a single transceiver 610 implementing multiple RATs (e.g., NR and LTE). In an aspect, the transceiver 610 can include various components, where different combinations of components can implement different RATs.

Figure 7:
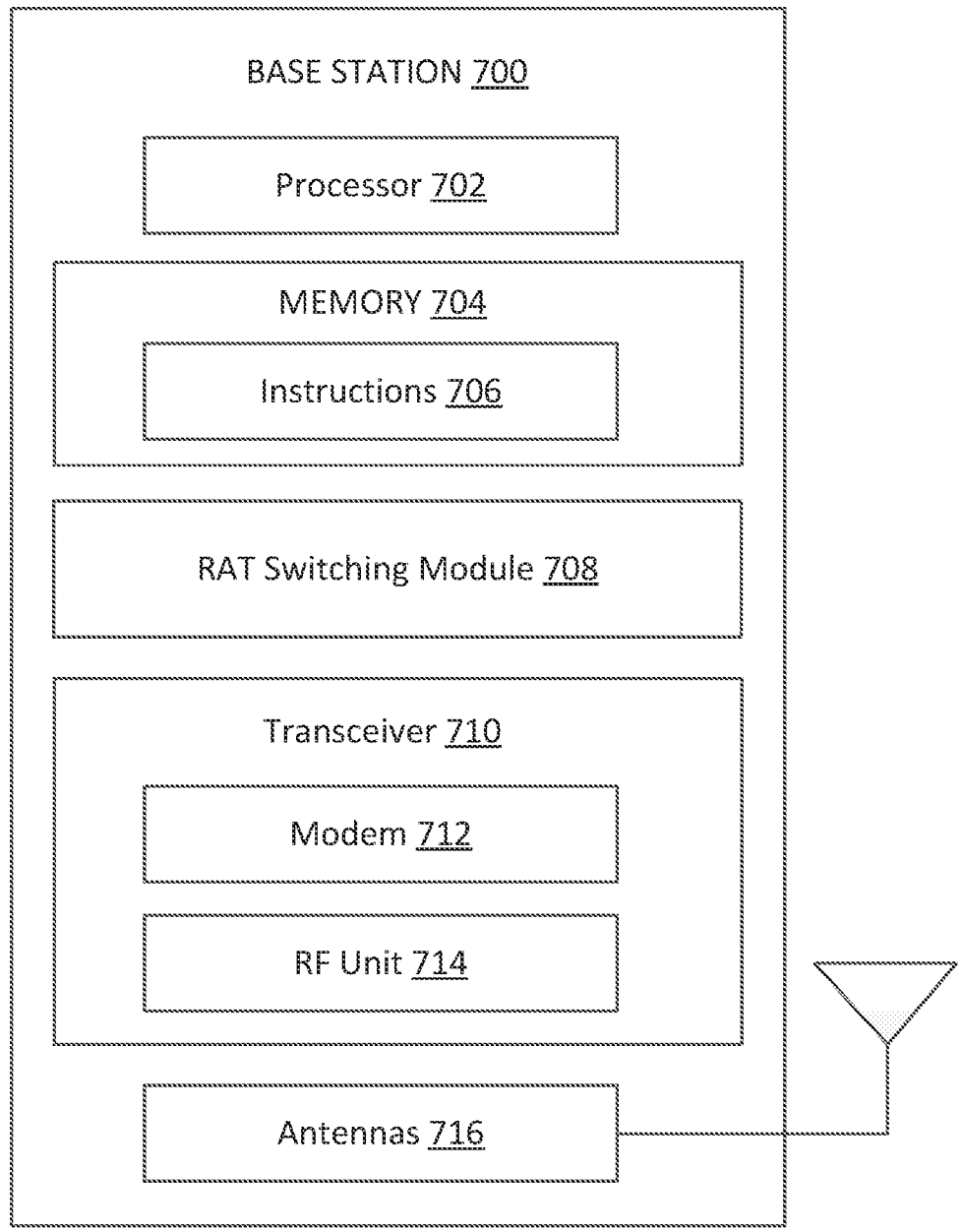
FIG. 7 is a block diagram of an exemplary base station (BS) according to some aspects of the present disclosure.

FIG. 7 is a block diagram of an exemplary BS 700 according to some aspects of the present disclosure. The BS 700 may be a BS 105 in the network 100 as discussed above in FIG. 1. The BS 700 may be a BS 105 as discussed above with reference to FIGS. 3-5. As shown in FIG. 7, the BS 700 may include a processor 702, a memory 704, a RAT switching module 708, a transceiver 710 including a modem subsystem 712 and a RF unit 714, and one or more antennas 716. These elements may be coupled with one another. The term "coupled" may refer to directly or indirectly coupled or connected to one or more intervening elements. For instance, these elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 2-5 and 8. Instructions 706 may also be referred to as code, which may be interpreted broadly to include any type of computer-readable statement(s) as discussed above.

The RAT switching module 708 may be implemented via hardware, software, or combinations thereof. For example, the RAT switching module 708 may be implemented as a processor, circuit, and/or instructions 706 stored in the memory 704 and executed by the processor 702. In some instances, the RAT switching module 708 can be integrated within the modem subsystem 712. For example, the RAT switching module 708 can be implemented by a combination of software components (e.g., executed by a DSP or a general processor) and hardware components (e.g., logic gates and circuitry) within the modem subsystem 712.

The RAT switching module 708 may be used for various aspects of the present disclosure, for example, aspects of FIGS. 2-5 and 8. The RAT switching module 708 may be configured to control transceiver 710 to transmit a MR configuration to a UE (e.g., UE 115). Transceiver 710 may be configured to receive an MR from the UE. The RAT switching module may be configured to evaluate the MR and determine if the values of the objects in the MR require a RAT mode switch to increase the quality of service to the UE. The RAT switching module 708 may be configured to control transceiver 710 to transmit a RAT mode switch command to the UE that instructs the UE to switch to a different RAT (e.g., switch from 5G NR to LTE).

As shown in FIG. 7, the transceiver 710 may include the modem subsystem 712 and the RF unit 714. The transceiver 710 can be configured to communicate bi-directionally with other devices, such as the UEs 115, another BS 105, and/or another core network element. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., an MR configuration, a RAT switch command, an MCS index, phase modulated signals, amplitude modulated signals, polarization modulated signals, a reference signal, a cell specific reference signal, a pilot signal, a downlink reference signal, a user equipment specific reference signal) from the modem subsystem 712 (on outbound transmissions) or of transmissions originating from another source, such as a UE 115. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g., data packets (or, more generally, data messages that may contain one or more data packets and other information), to the antennas 716 for transmission to one or more other devices. The antennas 716 may further receive data messages transmitted from other devices and provide the received data messages for processing and/or demodulation at the transceiver 710. The transceiver 710 may provide the demodulated and decoded data (e.g., the MR, SINR objects, RSRP objects, RSRQ objects) to the RAT switching module 708 for processing. The antennas 716 may include multiple antennas of similar or different designs in order to sustain multiple transmission links.

In an aspect, the BS 700 can include multiple transceivers 710 implementing different RATs (e.g., NR and LTE) in a DSS mode. In an aspect, the BS 700 can include a single transceiver 710 implementing multiple RATs (e.g., NR and LTE) in a DSS mode. In an aspect, the transceiver 710 can include various components, where different combinations of components can implement different RATs.

Figure 8:
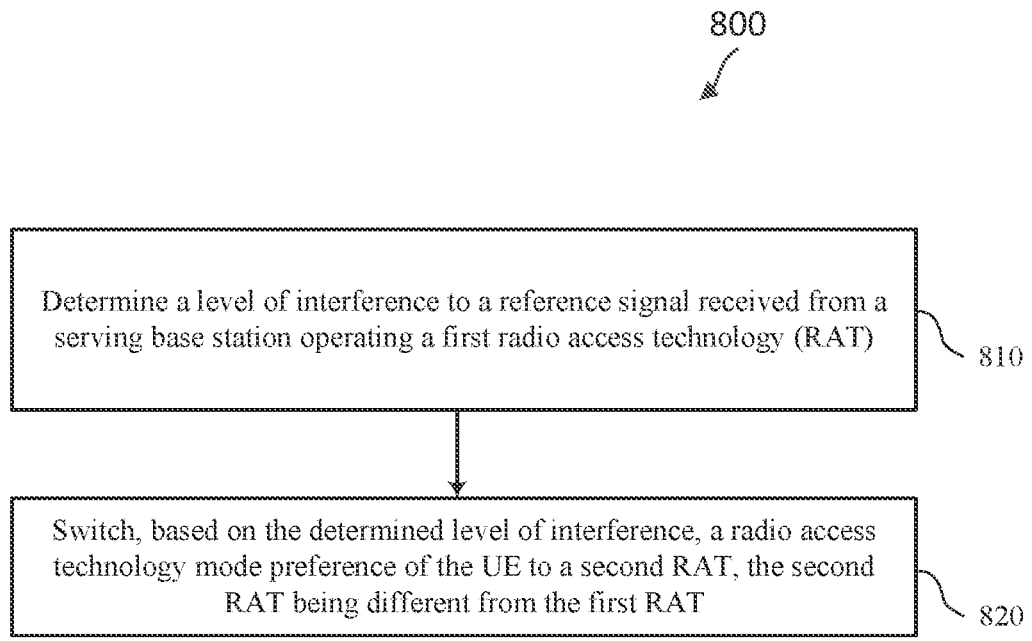
FIG. 8 is a flow diagram of a method of determining UE interference and switching a RAT mode according to some aspects of the present disclosure.

FIG. 8 is a flow diagram of a communication method 800 according to some aspects of the present disclosure. Steps of the method 800 can be executed by a computing device (e.g., a processor, processing circuit, and/or other suitable component) of an apparatus or other suitable means for performing the steps. For example, a wireless communication device, such as UEs 115 and/or UE 600 may utilize one or more components, such as the processor 602, the memory 604, the interference detection module 608, the transceiver 610, and the one or more antennas 616, to execute the steps of method 800. As another example, a wireless communication device, such as BSs 105, and/or BS 700, may utilize one or more components, such as the processor 702, the memory 704, the interference detection module 708, the transceiver 710, and the one or more antennas 716, to execute the steps of method 800. The method 800 may employ similar mechanisms as described above with respect to FIGS. 2-5. As illustrated in FIG. 8, the method 800 includes a number of enumerated steps, but aspects of the method 800 may include additional steps before, after, and in between the enumerated steps. In some aspects, one or more of the enumerated steps may be omitted or performed in a different order.

At block 810, a wireless communication device may determine a level of interference to a reference signal received from a serving base station operating a first RAT.

At block 820, the wireless communication device may switch, based on the determined level of interference, a radio access technology mode preference of the UE to a second RAT, the second RAT being different from the first RAT.

In some aspects, as part of determining a level of interference to a reference signal received from a serving base station at block 810, the wireless communication device may determine the level of interference by comparing a SINR ratio of the reference signal to a threshold level. The threshold level may be based on a maximum acceptable level of SINR degradation. For example, the maximum acceptable level of SINR degradation may be about 5 dB, about 10 dB, about 15 dB, about 20 dB, about 25 dB, or more. The UE may be configured to determine the interference threshold level based on a level of downlink throughput (e.g., downlink data rate) required by the UE. The UE may be configured to compare the measured SINR to the SINR threshold to determine if the threshold has been exceeded using the methods described in detail above with reference to FIGS. 2-5.

In some aspects, the UE may be configured to determine the level of interference by comparing a downlink MCS index of the UE to a threshold. The UE may be configured to use the MCS index value as a proxy for the level of interference. The UE may be configured to determine the level of interference by comparing a downlink MCS index to a threshold. The UE may receive control data from a BS (e.g., a gNB) indicating an MCS table and an MCS index value. A processor of the UE may be programmed to determine an MCS index threshold level using the methods described in detail above with reference to FIGS. 2-5.

In some aspects, the UE may be configured for DSS between the first RAT (e.g., 5G NR) and the second RAT (e.g., LTE). The UE may be configured for DSS operation in time division DSS mode and/or frequency division DSS mode.

In some aspects, the wireless communication device may switch the RAT mode of the UE to the first RAT based on comparing the SINR of the reference signal to an SINR threshold or comparing the MCS index of the UE to the MCS threshold.

In some aspects, the UE may be configured to switch the RAT mode of the UE to the second RAT during an RRC_Idle mode. The UE may be configured to then establish an RRC_connection mode with the second RAT using the methods described in detail above with reference to FIGS. 3-5 and 6.

In some aspects, switching the RAT mode of the UE to the second RAT may include switching the RAT mode based on a measurement event report. For example, in response to the level of interference to a reference signal exceeding a threshold, the UE may bias (e.g., adjust, weight, scale, skew, etc.) the value of any individual or combination of SINR, RSRP, and RSRQ measurement objects in the MR. The value of the measurement objects may be biased such that the BS may interpret the contents of the MR to indicate that the quality of service (e.g., BLER, data rate, etc.) to the UE does not meet certain requirements and a RAT mode switch is required to increase the quality of service to the UE. The BS may transmit a command to the UE instructing the UE to switch to a different RAT.

In some aspects, the UE may be configured to operate is a multi-SIM mode. The UE may set a default data subscription for the multi-SIM mode based on the level of interference to the reference signal received from the serving base station. The default data subscription may be set to LTE or 3G cellular technology.

In some wireless communications networks operating in a DSS mode, UEs may dynamically share spectrum in a frequency division or time-division mode. However, certain signals transmitted from a BS operating in 5G NR may experience interference and degradation from signals transmitted from neighboring BSs operating LTE. The interference from neighboring BS signals may negatively affect the downlink performance (e.g., downlink data rate) of the UE subjected to the interference. For example, persistent signals (e.g., CRS reference signals) from neighboring BSs may interfere with a downlink data channel (e.g., PDSCH) of the UE thereby reducing the downlink data rate of the UE. In some instances, determining the interference is above a threshold level and switching the operating RAT mode of the UE from 5G NR to LTE may reduce the interference from neighboring BSs and improve the downlink data rate of the UE. Accordingly, improved methods of selecting a RAT mode of a UE are desirable.

By way of non-limiting examples, the following aspects are included in the present disclosure.

Aspect 1 includes a method of wireless communication performed by a user equipment (UE), the method comprising determining a level of interference to a reference signal received from a serving base station operating a first radio access technology (RAT) and switching, based on the determined level of interference, a radio access technology mode preference of the UE to a second RAT, the second RAT being different from the first RAT.

Aspect 2 includes the method of aspect 1, wherein the determining the level of interference comprises comparing a signal-to-noise-plus-interference ratio of the reference signal to a threshold.

Aspect 3 includes the method of any of aspects 1-2, wherein the determining the level of interference comprises comparing a downlink modulation and coding scheme index of the UE to a threshold.

Aspect 4 includes the method of any of aspects 1-3, wherein the UE is configured for dynamic spectrum sharing (DSS) between the first RAT and the second RAT.

Aspect 5 includes the method of any of aspects 1-4, further comprising switching a RAT mode of the UE to the second RAT.

Aspect 6 includes the method of any of aspects 1-5, further comprising the switching the RAT mode of the UE to the first RAT based on at least one of comparing a signal-to-noise-plus-interference ratio (SINR) of the reference signal to an SINR threshold or comparing a downlink modulation and coding scheme (MCS) index of the UE to an MCS threshold.

Aspect 7 includes the method of any of aspects 1-6, wherein the switching the RAT mode of the UE to the second RAT comprises switching the RAT mode during an idle mode.

Aspect 8 includes the method of any of aspects 1-7, wherein the switching the RAT mode of the UE to the second RAT comprises switching the RAT mode based on a level of downlink throughput associated with the UE.

Aspect 9 includes the method of any of aspects 1-8, wherein the switching the RAT mode of the UE to the second RAT comprises switching the RAT mode based on a measurement event report.

Aspect 10 includes the method of any of aspects 1-9, wherein the first RAT comprises new radio (NR) and the second RAT comprises at least one of long term evolution (LTE) or third generation cellular technology.

Aspect 11 includes the method of any of aspects 1-10, wherein the interference is based on interference from a cell specific reference signal (CRS) associated with a neighboring cell.

Aspect 12 includes the method of any of aspects 1-11, wherein the reference signal comprises at least one of a reference signal received power (RSRP) reference signal or a physical downlink shared channel (PDSCH).

Aspect 13 includes the method of any of aspects 1-12, further comprising operating the UE in a multi-subscriber identification module mode and configuring, by the UE, and based on the level of interference to the reference signal received from the serving base station, a default data subscription of the multi-subscriber identification module.

Aspect 14 includes the method of any of aspects 1-13, wherein the default data subscription of the multi-subscriber identification module comprises at least one of long term evolution (LTE) or third generation cellular technology.

Aspect 15 includes a user equipment (UE), comprising a processor, wherein the processor is configured to perform any one of aspects 1-14.

Aspect 16 includes a non-transitory computer-readable medium having program code recorded thereon for wireless communication by a user equipment (UE), the program code comprising code for causing the UE to perform any one of aspects 1-14.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
    determining a level of interference to a reference signal received from a serving base station, the UE operating in a first radio access technology (RAT);
    switching, during a radio resource control (RRC) connected mode and based on the determined level of interference and an estimated throughput of the first RAT falling below a first threshold, a radio access technology mode preference of the UE to a second RAT, the second RAT being different from the first RAT; and
    switching the radio access technology mode preference of the UE to the first RAT based on an estimated throughput of the second RAT falling below a second threshold.

2. The method of claim 1, wherein the determining the level of interference comprises comparing a signal-to-noise-plus-interference ratio of the reference signal to a threshold.

3. The method of claim 1, wherein the determining the level of interference comprises comparing a downlink modulation and coding scheme index of the UE to a threshold.

4. The method of claim 1, wherein the UE is configured for dynamic spectrum sharing (DSS) between the first RAT and the second RAT.

5. The method of claim 1, further comprising switching a RAT mode of the UE to the second RAT.

6. The method of claim 5, further comprising switching the RAT mode of the UE to the first RAT based on at least one of:
    comparing a signal-to-noise-plus-interference ratio (SINR) of the reference signal to an SINR threshold; or
    comparing a downlink modulation and coding scheme (MCS) index of the UE to an MCS threshold.

7. The method of claim 5, wherein the switching the RAT mode of the UE to the second RAT comprises switching the RAT mode during the RRC connected mode.

8. The method of claim 5, wherein the switching the RAT mode of the UE to the second RAT comprises switching the RAT mode based on a level of downlink throughput associated with the UE.

9. The method of claim 5, wherein the switching the RAT mode of the UE to the second RAT comprises switching the RAT mode based on a measurement event report.

10. The method of claim 1, wherein:
    the first RAT comprises new radio (NR); and
    the second RAT comprises at least one of long term evolution (LTE) or third generation cellular technology.

11. The method of claim 1, wherein the interference is based on interference from a cell specific reference signal (CRS) associated with a neighboring cell.

12. The method of claim 1, wherein the reference signal comprises at least one of a reference signal received power (RSRP) reference signal or a physical downlink shared channel (PDSCH).

13. The method of claim 1, further comprising:
    operating the UE in a multi-subscriber identification module mode; and
    configuring, by the UE, and based on the level of interference to the reference signal received from the serving base station, a default data subscription of the multi-subscriber identification module.

14. The method of claim 13, wherein the default data subscription of the multi-subscriber identification module comprises at least one of long term evolution (LTE) or third generation cellular technology.

15. A user equipment (UE), comprising:
a memory;
a transceiver; and
at least one processor coupled to the memory and the transceiver, wherein the UE is configured to:
determine a level of interference to a reference signal received from a serving base station, the UE operating in a first radio access technology (RAT);
switch, during a radio resource control (RRC) connected mode and based on the level of interference and an estimated throughput of the first RAT falling below a first threshold, a radio access technology mode preference of the user equipment to a second RAT, the second RAT being different from the first RAT; and
switch the radio access technology mode preference of the UE to the first RAT based on an estimated throughput of the second RAT falling below a second threshold.

16. The user equipment of claim 15, wherein the determining the level of interference comprises comparing a signal-to-noise-plus-interference ratio of the reference signal to a threshold.

17. The user equipment of claim 15, wherein the determining the level of interference comprises comparing a downlink modulation and coding scheme index of the UE to a threshold.

18. The user equipment of claim 15, wherein the UE is configured for dynamic spectrum sharing (DSS) between the first RAT and the second RAT.

19. The user equipment of claim 15, wherein the UE is further configured to switch a RAT mode of the UE to the second RAT.

20. The user equipment of claim 19, wherein the UE is further configured to switch the RAT mode of the UE to the first RAT based on at least one of:
comparing a signal-to-noise-plus-interference ratio (SINR) of the reference signal to an SINR threshold; or
comparing a downlink modulation and coding scheme (MCS) index of the UE to an MCS threshold.

21. The user equipment of claim 19, wherein the UE is further configured to switch the RAT mode of the UE to the second RAT during the RRC connected mode.

22. The user equipment of claim 19, wherein the UE is further configured to switch the RAT mode of the UE to the second RAT based on a level of downlink throughput associated with the UE.

23. The user equipment of claim 19, wherein the UE is further configured to switch the RAT mode of the UE to the second RAT based on a measurement event report.

24. The user equipment of claim 15, wherein:
the first RAT comprises new radio (NR); and
the second RAT comprises at least one of long term evolution (LTE) or third generation cellular technology.

25. The user equipment of claim 15, wherein the interference is based on interference from a cell specific reference signal (CRS) associated with a neighboring cell.

26. The user equipment of claim 15 wherein the reference signal comprises at least one of a reference signal received power (RSRP) reference signal or a physical downlink shared channel (PDSCH).

27. The user equipment of claim 15, wherein the UE is further configured to:
operate in a multi-subscriber identification module mode; and
configure, based on the level of interference to the reference signal received from the serving base station, a default data subscription of the multi-subscriber identification module.

28. The user equipment of claim 27, wherein the default data subscription of the multi-subscriber identification module comprises at least one of long term evolution (LTE) or third generation cellular technology.

29. A non-transitory computer-readable medium having program code recorded thereon for wireless communication by a user equipment (UE), the program code comprising:
code for causing the UE to determine a level of interference to a reference signal received from a serving base station, the UE operating in a first radio access technology (RAT);
code for causing the UE to switch, during a radio resource control (RRC) connected mode and based on the level of interference and an estimated throughput of the first RAT falling below a first threshold, a radio access technology mode preference of the user equipment to a second RAT, the second RAT being different from the first RAT; and
code for causing the UE to switch the radio access technology mode preference of the UE to the first RAT based on an estimated throughput of the second RAT falling below a second threshold.

30. The non-transitory computer-readable medium of claim 29, wherein the code for causing the UE to determine the level of interference includes code for causing the user equipment to compare a signal-to-noise-plus-interference ratio of the reference signal to a threshold.

* * * * *